US012752574B2

United States Patent

(12) United States Patent
Reinhardt et al.
(10) Patent No.: US 12,752,574 B2
(45) Date of Patent: Oct. 6, 2026

(54) NON-PNEUMATIC TIRE HAVING REINFORCED SUPPORT STRUCTURE AND METHOD OF MAKING SAME

(71) Applicant: Bridgestone Americas Tire Operations, LLC, Nashville, TN (US)

(72) Inventors: Sharon E. Reinhardt, Fairlawn, OH (US); Adam K. Nesbitt, Akron, OH (US); Benjamin E. Rimai, Copley, OH (US); Anthony B. Duncan, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 269 days.

(21) Appl. No.: 18/699,094

(22) PCT Filed: Oct. 4, 2022

(86) PCT No.: PCT/US2022/077492
§ 371 (c)(1),
(2) Date: Apr. 9, 2024

(87) PCT Pub. No.: WO2023/064688
PCT Pub. Date: Apr. 20, 2023

(65) Prior Publication Data

US 2024/0343067 A1 Oct. 17, 2024

Related U.S. Application Data

(60) Provisional application No. 63/254,671, filed on Oct. 12, 2021.

(51) Int. Cl.
*B60C 7/14* (2006.01)
*B60C 7/22* (2006.01)
*B60C 7/24* (2006.01)

(52) U.S. Cl.
CPC .............. *B60C 7/146* (2021.08); *B60C 7/143* (2013.01); *B60C 7/22* (2013.01); *B60C 7/24* (2013.01)

(58) Field of Classification Search
CPC ........... B60C 7/143; B60C 7/146; B60C 7/24; B60C 7/26
See application file for complete search history.

(56) References Cited

U.S. PATENT DOCUMENTS 7,201,194 B2 4/2007 Rhyne et al.
9,180,732 B2 11/2015 Endicott
(Continued)

FOREIGN PATENT DOCUMENTS

JP 2009269410 11/2009
JP 2018193046 12/2018
(Continued)

OTHER PUBLICATIONS

International Search Report & Written Opinion; Corresponding PCT Application No. PCT/2022/077492; Authorized Officer Tae Wook Park; Jan. 26, 2023.
(Continued)

*Primary Examiner* — Kip T Kotter
(74) *Attorney, Agent, or Firm* — Shaun J. Fox; Bryan J. Jaketic

(57) ABSTRACT

A non-pneumatic tire includes a ring, a circumferential tread disposed about the ring, and a plurality of support structures extending downwards from the ring. An end of each support structure includes an axially extending member, and each support structure includes a reinforcement layer extending along a length of the support structure and wrapping around the axially extending member.

14 Claims, 6 Drawing Sheets

(56) References Cited

U.S. PATENT DOCUMENTS

| | | | | |
|---|---|---|---|---|
| 10,350,945 | B2 | 7/2019 | Benzing, II | |
| 2004/0069385 | A1 | 4/2004 | Timoney et al. | |
| 2016/0214435 | A1* | 7/2016 | Schaedler | B60C 7/18 |
| 2017/0057287 | A1* | 3/2017 | Martin | B60B 9/26 |
| 2018/0134072 | A1 | 5/2018 | Celik | |
| 2018/0134083 | A1 | 5/2018 | Celik | |
| 2018/0170095 | A1 | 6/2018 | Costlow et al. | |
| 2019/0001744 | A1* | 1/2019 | Delfino | B60C 7/14 |
| 2019/0337328 | A1 | 11/2019 | Celik | |
| 2020/0001648 | A1 | 1/2020 | Celik | |
| 2020/0047555 | A1 | 2/2020 | Costlow et al. | |
| 2020/0298616 | A1 | 9/2020 | Costlow et al. | |
| 2021/0061010 | A1 | 3/2021 | Van Riper et al. | |

FOREIGN PATENT DOCUMENTS

| | | | |
|---|---|---|---|
| JP | 2020517511 | | 6/2020 |
| JP | 2021031057 | | 3/2021 |
| WO | 2017072562 | A1 | 4/2007 |
| WO | 2011025491 | | 3/2011 |
| WO | 2017116454 | A1 | 6/2017 |
| WO | 2017116463 | A1 | 6/2017 |
| WO | 2017116472 | A1 | 6/2017 |
| WO | 2017116475 | A1 | 6/2017 |
| WO | 2017116478 | A1 | 6/2017 |
| WO | 2017117365 | A1 | 6/2017 |
| WO | 2017117368 | A1 | 6/2017 |
| WO | 2017117598 | A1 | 6/2017 |
| WO | 2017117599 | A1 | 6/2017 |
| WO | 2017117605 | A1 | 6/2017 |

OTHER PUBLICATIONS

Supplementary European Search Report; Corresponding EP Application Serial No. 22881909; Jul. 24, 2025.

* cited by examiner

NON-PNEUMATIC TIRE HAVING REINFORCED SUPPORT STRUCTURE AND METHOD OF MAKING SAME

FIELD OF INVENTION

The present disclosure relates to a non-pneumatic tire having reinforced support structure and a method of making the same. More particularly, the present disclosure relates to a non-pneumatic tire having reinforced spokes or webbing having reinforcements at least partially wrapped around elongated members, and a method of making the same.

BACKGROUND

Various tire constructions have been developed which enable a tire to run in an uninflated or underinflated condition. Non-pneumatic tires do not require inflation, while "run flat tires" may continue to operate after receiving a puncture and a complete or partial loss of pressurized air, for extended periods of time and at relatively high speeds. Non-pneumatic tires may include a plurality of spokes, a webbing, or other support structure that connects an inner ring to an outer ring.

SUMMARY OF THE INVENTION

In one embodiment, a non-pneumatic tire and rim assembly includes a non-pneumatic tire having a ring, a circumferential tread disposed about the ring, and a plurality of spokes extending radially downward from the ring. Each spoke terminates at a lower end defined by an axially extending member. Each spoke includes a reinforcement at least partially wrapping around the axially extending member. The reinforcement may be a plurality of cords of reinforcement material, a mesh of reinforcement material, or a sheet of reinforcement material. The assembly also includes a rim having a plurality of mounts. Each mount is configured to receive the axially extending member of a corresponding spoke.

In another embodiment, a method of making a non-pneumatic tire includes the steps of providing a ring, providing a plurality of elongated members, and arranging the elongated members inside the ring, such that each elongated member extends in an axial direction relative to the ring. The method also includes providing a ribbon of reinforcement material, and wrapping the ribbon of reinforcement material along a circuitous path along an inner surface of the ring and around each of the elongated members.

In yet another embodiment, a non-pneumatic tire includes a ring, a circumferential tread disposed about the ring, and a plurality of support structures extending downwards from the ring. An end of each support structure includes an axially extending member, and each support structure includes a reinforcement layer extending along a length of the support structure and wrapping around the axially extending member.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
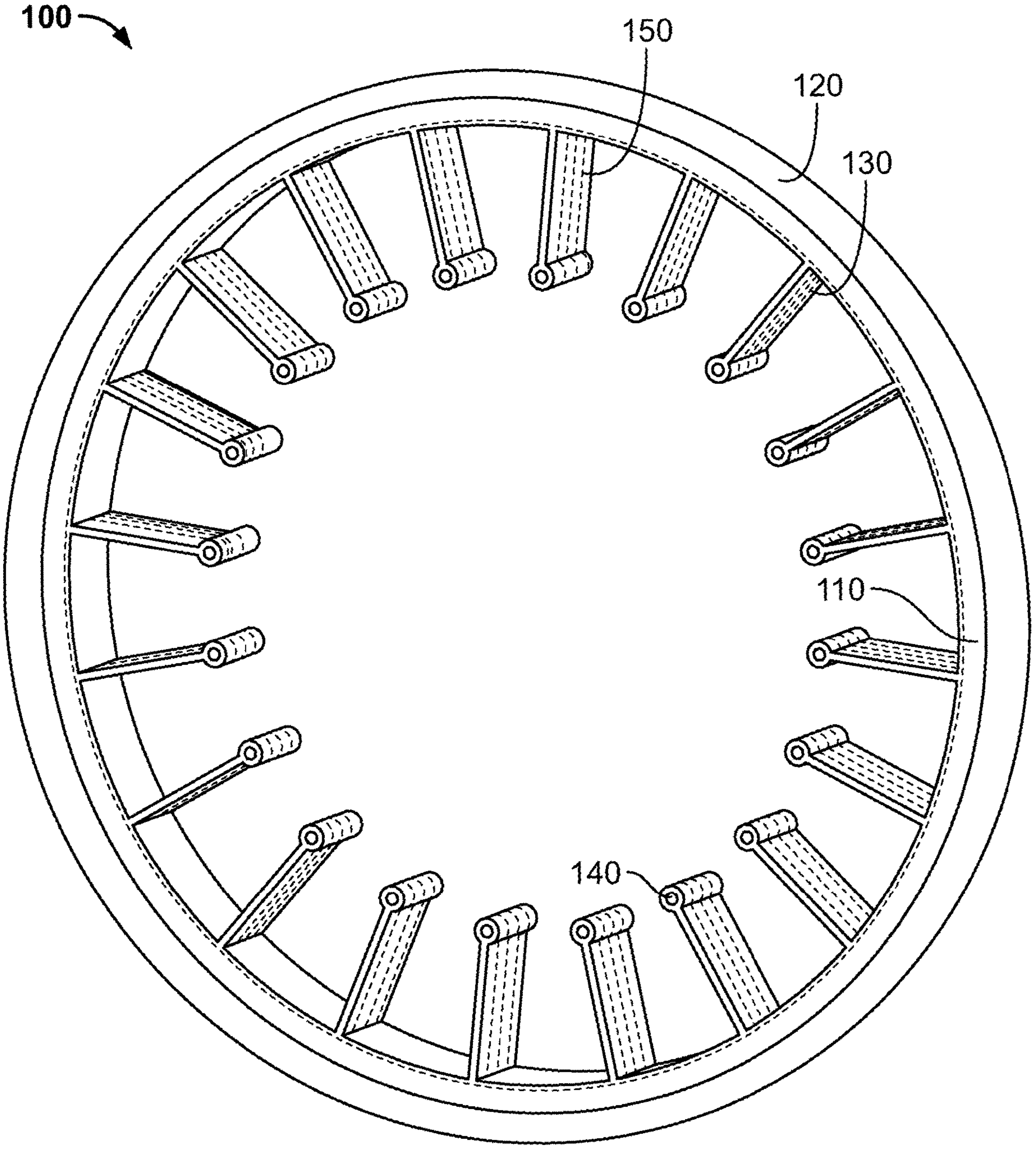
FIG. 1 is a perspective view of one embodiment of a non-pneumatic tire.

FIG. 1 is a perspective view of one embodiment of a non-pneumatic tire 100. The non-pneumatic tire 100 includes an annular band or ring 110 with a circumferential tread 120 disposed about the ring 110. In the illustrated embodiment, the tread 120 is a separate rubber component disposed about the ring 110. The tread 120 may include ribs, blocks, grooves, sipes, or other tread elements (not shown). The tread 120 may be affixed to the ring 110 with an adhesive. Alternatively, the tread 120 may be affixed to the ring 110 through a curing process or a chemical bonding process.

In an alternative embodiment (not shown), the ring itself forms the tread of tire. As such, it may include ribs, blocks, grooves, sipes, or other tread elements (not shown).

In the illustrated embodiment, a plurality of support structures in the form of spokes 130 extend downward (i.e., towards the axis of rotation) from the ring 110. In the illustrated embodiment, each spoke 130 extends axially across the entire ring 110. In an alternative embodiment, each spoke extends only partially across the ring. In one such embodiment, two or more rows of spokes may be employed. The rows may be aligned with each other or offset from each other.

In the illustrated embodiment, the spokes 130 are substantially linear and extend in a radial direction. In alternative embodiments, the spokes may be curved or disposed at an acute angle relative to the radial direction. The spokes may also be V-shaped, crisscrossed, or have any geometric shape. Alternatively, a webbing or other support structure may be employed.

Each spoke 130 terminates at a lower end having an elongated member 140. In the illustrated embodiment, the elongated members 140 are axially extending members. In alternative embodiments (not shown), the elongated members may extend in a non-axial direction.

The elongated members 140 define an inner diameter of the tire 100. In the illustrated embodiment, each elongated member 140 is a cylindrical rod, such as a pin, a post, a tab, or a threaded rod.

The non-pneumatic tire 100 further includes a reinforcement layer 150 extending along the ring 110 and the spokes 130. The reinforcement layer 150 at least partially wraps around each elongated member 140. The reinforcement layer 150 may take the form of a plurality of cords of reinforcement material, a mesh of reinforcement material, and a sheet of reinforcement material. Exemplary reinforcement material includes steel or other metal, nylon, polyester, fiberglass, carbon fiber, aramid, glass, polyethylene (polyethylene terephthalate). However, the reinforcement layer is not limited to any particular reinforcement material.

To build the non-pneumatic tire 100, the reinforcement layer 150 may be first embedded in the embedding material. For example, the reinforcement layer may be co-extruded with a green elastomeric material to form a green, reinforced ribbon. Alternatively, the reinforcement layer 150 may be a separate layer used in a tire build, which is then overlaid with the embedding material. For example, a ribbon or sheet of reinforcement material may be applied to the tire build and then a ribbon or sheet of embedding material may then be applied to the reinforcement layer. The tire build may then be cured in a vulcanization mold or autoclave, or through other curing means. As another example, a ribbon or sheet of reinforcement material may be applied to the tire build and then the tire build may be over molded with embedding material in an injection mold or compression mold.

In one embodiment, the reinforcement layer is a plurality of cords that are embedded in a ribbon of green elastomeric material. In one specific embodiment, the cords extend in a longitudinal direction of the ribbon. In such an embodiment, the cords would extend in a radial direction along each spoke. In alternative embodiments, the cords may be biased with respect to the longitudinal direction or may extend in a lateral direction. In such an embodiment, the cords would extend in a biased direction or a lateral direction along each spoke.

In all embodiments, the embedding material may be further coated with a protective material. For example, the embedding material may be coated with a material formulated to have material properties that are better at withstanding exposure to the ozone than the embedding material. Such material may include tire sidewall compound, veneer compound, synthetic rubber such as ethylene propylene diene monomer (EPDM) rubber, neoprene, butyl rubber, a hydrogenated diene rubber, or other compounds formulated to withstand exposure to ozone. The coating may be a different color from the embedding material.

While a single reinforcement layer 150 is shown in FIG. 1, it should be understood that two or more reinforcement layers may be employed. Additionally, the number of reinforcement layers may vary at different parts of the tire 100. For example, the ring 110 may have more reinforcement layers than the spokes 130. Alternatively, the spokes 130 may have more reinforcement layers than the ring 110.

Figure 2:
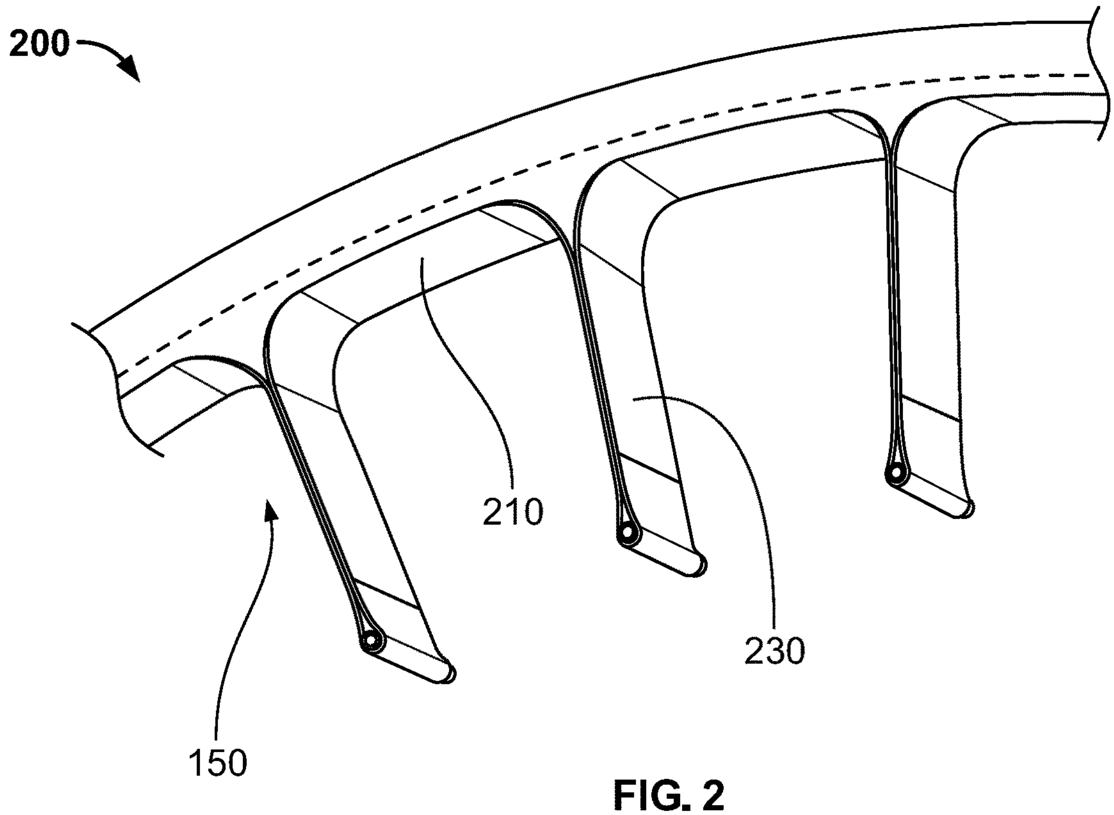
FIG. 2 is an enlarged partial front view of a skeleton of the non-pneumatic tire of FIG. 1.
Figure 3:
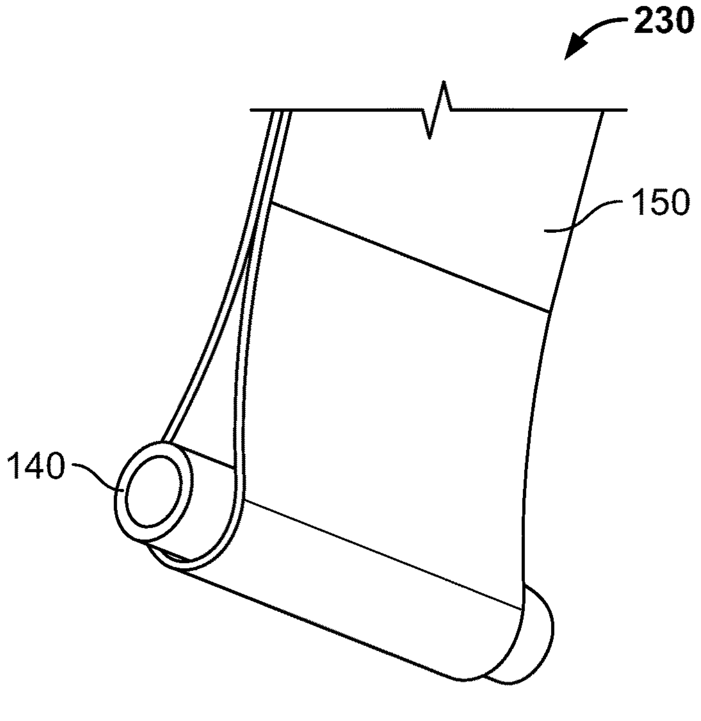
FIG. 3 is a detail view of a skeleton of a spoke of the non-pneumatic tire of FIG. 1.

FIG. 2 is an enlarged partial front view of a skeleton 200 of the non-pneumatic tire 100 of FIG. 1. The skeleton 200 includes a skeleton ring 210 and a plurality of skeleton spokes 230. FIG. 3 is a detail view of a skeleton spoke 230 of the non-pneumatic tire of FIG. 1. The skeleton 200 will be described with respect to both FIGS. 1 and 2.

The skeleton 200 is for illustrative purposes only, to show the relationship between the reinforcement layer 150 and other elements of the non-pneumatic tire 100. While the skeleton 200 may represent a partial build according to one method of making a reinforced tire, it is merely presented here to illustrate what the tire 100 would theoretically look like if all embedding material could be removed.

In the illustrated embodiment, the reinforcement layer 150 is shown as a mesh. The reinforcement layer 150 is illustrated as a serpentine ribbon that is disposed continuously about a central axis of the skeleton 200, and following a winding path along an inner portion of the skeleton ring 210 and about the elongated member 140 of each skeleton spoke 230. In the illustrated embodiment, the reinforcement layer 150 follows a substantially radial path from the skeleton ring 210 to the elongated member 140. In alternative embodiments, the reinforcement layer may follow a non-radial path from the skeleton ring to the elongated member. For example, the reinforcement layer may follow a curved or an angled path.

In one embodiment, the reinforcement layer 150 is adhered to each elongated member 140 with an adhesive or through a curing process or a chemical bond. In such embodiments, the reinforcement layer 150 may be directly adhered to the elongated member 140, or an embedding material containing the reinforcement layer may be adhered to the elongated member 140.

In an alternative embodiment, the reinforcement layer 150 is not adhered to the elongated member 140. In such an embodiment, the elongated member 140 is free to rotate or translate with respect to the reinforcement layer 150. The mechanical interaction between the elongated member 140 and the reinforcement layer 150 may thus be selected to achieve different performances. In some embodiments, it may be desirable for the elongated member to be fixed with respect to the reinforcement layer. In other embodiments, it may be desirable for the elongated member to rotate with respect to the reinforcement layer, without translating. In still other embodiments, it may be desirable for the elongated member to translate with respect to the reinforcement layer, without rotating. In still other embodiments, it may be desirable for the elongated member to rotate and translate with respect to the reinforcement layer.

With continued reference to FIGS. 2 and 3, the elongated member 140 is a rod. In one embodiment, the rod is a threaded rod. Alternatively, the rod may be a smooth rod with threaded ends. In such an embodiment, the rod may be configured to receive threaded nuts at both ends. In yet another embodiment, the rod is a smooth rod.

Figure 4:
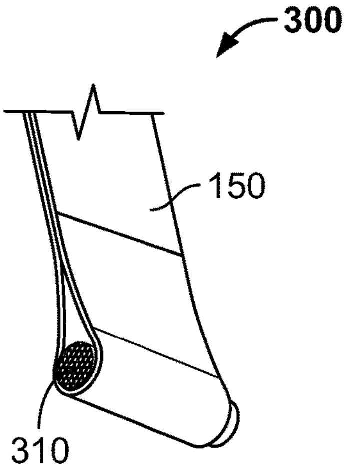
FIG. 4 is a detail view of an alternative embodiment of a skeleton of a spoke.

FIG. 4 is a detail view of an alternative embodiment of a skeleton spoke 300. In this embodiment, the skeleton spoke 300 is substantially the same as the skeleton spoke 230 except for the differences described herein. In the skeleton spoke 300, the elongated member is formed by a bundle of steel cords 310. The bundle of steel cords 310 may be referred to as a bead 310, because it resembles the bead of a pneumatic tire.

Figure 5:
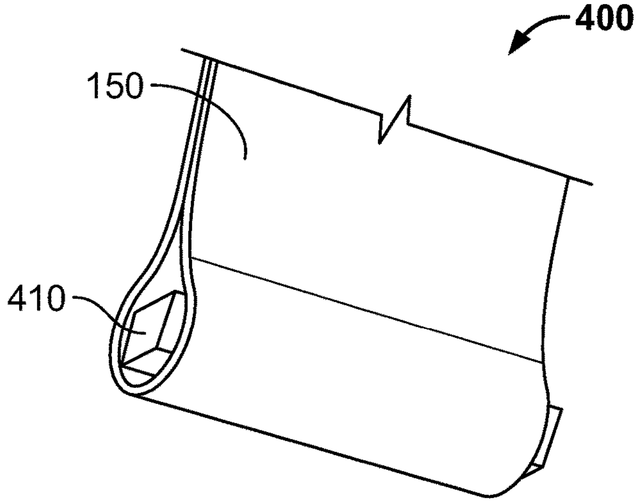
FIG. 5 is a detail view of another alternative embodiment of a skeleton of a spoke.

FIG. 5 is a detail view of another alternative embodiment of a skeleton spoke 400. In this embodiment, the skeleton spoke 400 is substantially the same as the skeleton spokes 230 and 300, except for the differences described herein. In the skeleton spoke 400, the elongated member is formed by a bar 410 having a rectangular cuboid shape. In alternative embodiments (not shown), the bar may have any geometric cross-section.

FIGS. 6-11 are schematic drawings illustrating front views of various embodiments of a reinforcement layer at least partially wrapped around an elongated member. While each of these embodiments depict an elongated member having a circular cross-section (i.e., a rod), it should be understood that any of the elongated members described above may be employed.

Figure 6:
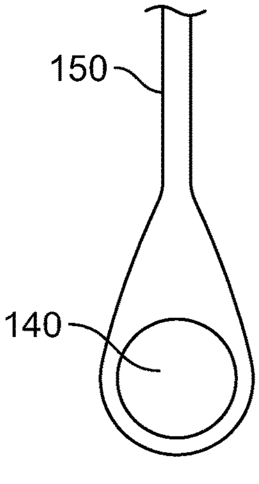
FIG. 6 is a schematic drawing illustrating a front view of a reinforcement layer wrapped around an elongated member of the non-pneumatic tire of FIG. 1.

FIG. 6 is a schematic drawing illustrating a front view of the reinforcement layer 150 wrapped around the elongated member 140 of the non-pneumatic tire of FIG. 1. As can be seen in this view, the reinforcement layer 150 is a continuous layer that wraps around the elongated member 140.

Figure 7:
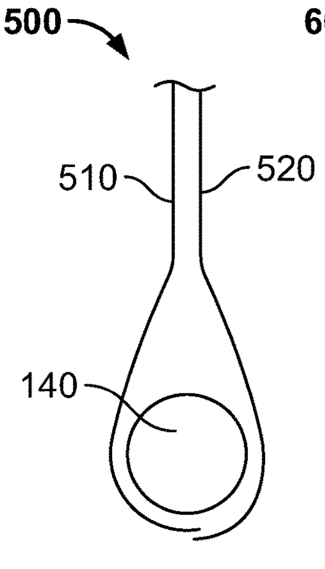
FIG. 7 is a schematic drawing illustrating a front view of an alternative embodiment of a reinforcement layer wrapped around an elongated member.

FIG. 7 is a schematic drawing illustrating a front view of an alternative embodiment of a reinforcement layer 500 wrapped around the elongated member 140. In this embodiment, the reinforcement layer 500 includes a first reinforcement layer 510 wrapping around a left side of the elongated member 140 and terminating at a first end below the elongated member 140. The reinforcement layer 500 further includes a second reinforcement layer 520 wrapping around a right side of the elongated member 140 and terminating at a second end below the elongated member 140 and below a portion of the first reinforcement layer 510. In this embodiment, the end portion of the first reinforcement layer 510 may be affixed to the end portion of the second reinforcement layer 520.

Figure 8:
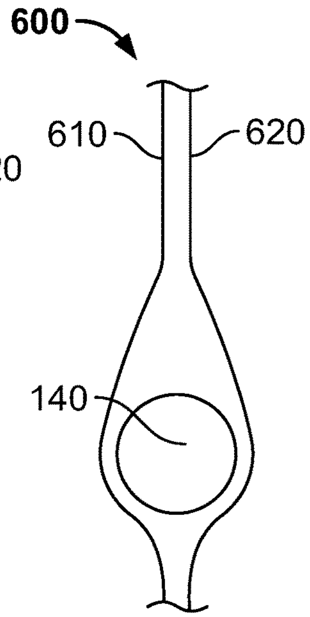
FIG. 8 is a schematic drawing illustrating a front view of another alternative embodiment of a reinforcement layer wrapped around an elongated member.

FIG. 8 is a schematic drawing illustrating a front view of another alternative embodiment of a reinforcement layer 600 wrapped around the elongated member 140. In this embodiment, the reinforcement layer 600 includes a first reinforcement layer 610 wrapping around a left side of the elongated member 140 and terminating at a first end below the elongated member 140. The reinforcement layer 600 further includes a second reinforcement layer 620 wrapping around a right side of the elongated member 140 and terminating at a second end below the elongated member 140. In this embodiment, however, the ends of the first and second reinforcement layers 610, 620 do not overlap each other. Instead, the end of the first reinforcement layer 510 and the end of the second reinforcement layer 520 may be affixed to a rim or other component.

Figure 9:
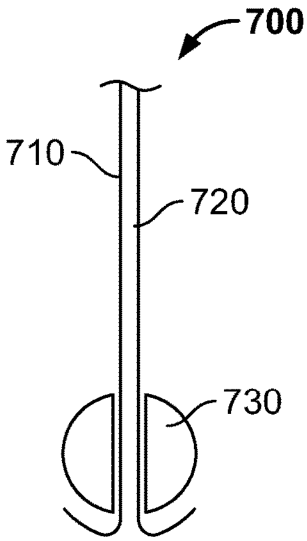
FIG. 9 is a schematic drawing illustrating a front view of yet another alternative embodiment of a reinforcement layer wrapped around an elongated member.

FIG. 9 is a schematic drawing illustrating a front view of yet another alternative embodiment of a reinforcement layer 700 having a first reinforcement layer 710 and a second reinforcement layer 720, each of which are wrapped around an elongated member 730. In the illustrated embodiment, the elongated member 730 is a split member and the first and second reinforcement layers 710, 720 each pass through a center channel of the split, elongated member 730. After passing through the center channel, the first reinforcement layer 710 wraps partially around the bottom left portion of the elongated member 730 and the second reinforcement layer 720 wraps around the bottom right portion of the elongated member 730.

Figure 10:
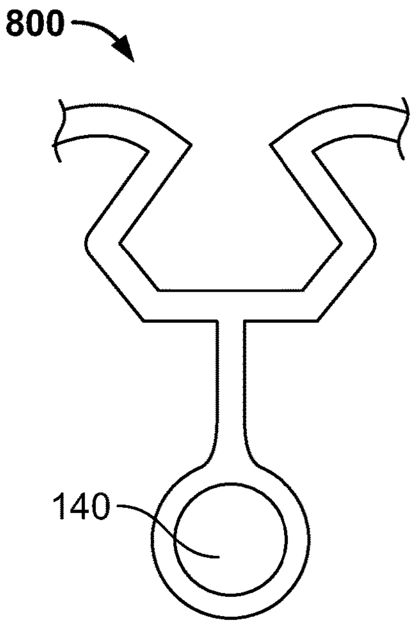
FIG. 10 is a schematic drawing illustrating a front view of a reinforcement layer wrapped around an elongated member of a webbing of a non-pneumatic tire.

FIG. 10 is a schematic drawing illustrating a front view of a reinforcement layer 800 wrapped around an elongated member 140 of an exemplary webbing of a non-pneumatic tire. It should be understand that the webbing may have any shape, and the webbing shown in this figure is merely for illustrative purposes.

The reinforcement layer 800 is substantially the same as the other reinforcement layers described above, except the reinforcement layer 800 defines a portion of a web instead of a radially extending spoke. The reinforcement layer 800 may be a continuous layer that wraps around a series of rigid members forming a webbing. Alternatively, the reinforcement layer 800 may be formed by a plurality of reinforcement layers. For example, any of the multi-layer embodiments shown and described with respect to FIGS. 7-9 may be applied to the webbing embodiment illustrated in FIG. 10.

Figure 11:
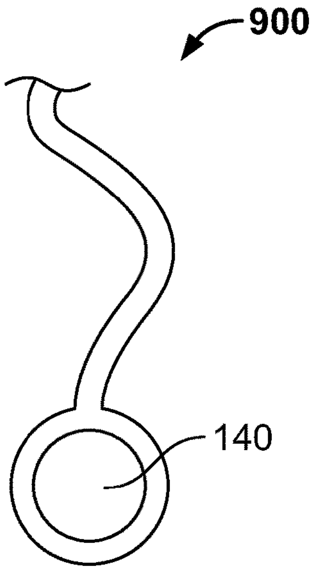
FIG. 11 is a schematic drawing illustrating a front view of a reinforcement layer wrapped around an elongated member of a curved spoke of a non-pneumatic tire.

FIG. 11 is a schematic drawing illustrating a front view of a reinforcement layer 900 wrapped around an elongated member 140 of an exemplary curved spoke of a non-pneumatic tire. It should be understand that the spoke may have any shape, and the curved spoke shown in this figure is merely for illustrative purposes.

The reinforcement layer 900 is substantially the same as the other reinforcement layers described above, except instead of defining a radially extending spoke the reinforcement layer 800 defines a curved spoke. The reinforcement layer 900 may be a continuous layer that wraps around each of the plurality of elongated members 140 of the tire. Alternatively, the reinforcement layer 900 may be formed by a plurality of reinforcement layers. For example, any of the multi-layer embodiments shown and described with respect to FIGS. 7-9 may be applied to the curved spoke embodiment illustrated in FIG. 11.

Figure 12:
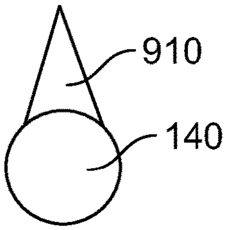
FIG. 12 is a schematic drawing illustrating a front view of an elongated member and a bead filler.

FIG. 12 is a schematic drawing illustrating a front view of an elongated member 140 and a bead filler 910. The bead filler 910 is disposed above the elongated member 140 and provide additional rigidity. The bead filler 910 also prevents abrasion from the reinforcement layer. Although the bead filler 910 is shown with an elongated member 140 having a circular cross-section (i.e., a rod), it should be understood that any of the elongated members described above may be employed. The bead filler may be constructed of an elastomeric material. In one embodiment, the bead filler is constructed of the same material as the embedding material. In an alternative embodiment, the bead filler is constructed of a material that is stiffer than the embedding material. For example, the bead filler may be made of fiberglass or metal.

In the illustrated embodiment, the bead filler 910 is in contact with the elongated member 140. In an alternative embodiment, the bead filler is spaced from the elongated member.

In the illustrated embodiment, the bead filler 910 is shown as having a substantially triangular shape and a height that is approximately equal to the diameter of the elongated member 140. It should be understood, however, that the shape and the dimensions of the bead filler may be varied to achieve a desired performance. For example, the bead filler 910 may have a height that is less than 20% of the height of a spoke. In another embodiment, the bead filler 910 may have a height equal to 20-40% of the height of a spoke. In another embodiment, the bead filler 910 may have a height equal to 40-60% of the height of a spoke. In another embodiment, the bead filler 910 may have a height equal to 60-80% of the height of a spoke. In another embodiment, the bead filler 910 may have a height equal to 80-100% of the height of a spoke.

The bead filler 910 may control the rotation of the elongated member 140 with respect to reinforcement layer 150 as well as with respect to attachment points on a rim. Changing the length and other dimensions of the bead filler would affect such rotation.

Additionally, the bead filler 910 may affect how the spokes deflect during compression. The material and the dimensions of the bead filler may be selected to control the amount and the direction of such deflections.

Figure 13:
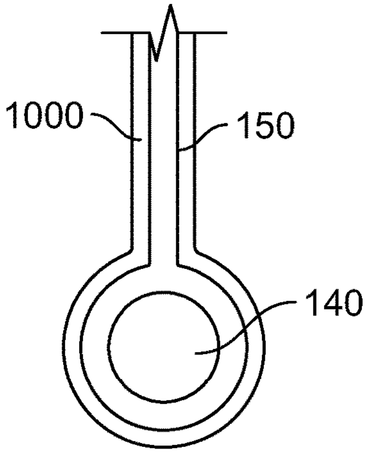
FIG. 13 is a schematic drawing illustrating a front view of one embodiment of a spoke in a pre-cured tire.

FIG. 13 is a schematic drawing illustrating a front view of one embodiment of a spoke in a pre-cured tire. In this embodiment, a reinforcement layer 150 and an embedding material 1000 wrapped around an elongated member 140. In the illustrated embodiment, the reinforcement layer 150 and embedding material 1000 form a spoke similar to those shown in FIGS. 1-9. However, it should be understood that an embedding material may be employed on any spoke or webbing design, such as those shown in FIGS. 10 and 11, as well as the alternative designs discussed above.

In the illustrated embodiment, the embedding material 1000 is shown as having a consistent thickness along the entire spoke. In one embodiment, the embedding material 1000 is constructed of a single material. The embedding material 1000 may be constructed of a polymeric material, such as natural or synthetic rubber, or other elastomeric material. Alternatively, the embedding material 1000 may be constructed of a harder polymeric material such as polyurethane, polyester, nylon, or polyvinyl chloride (PVC). Alternatively, the embedding material may be one or more resins.

In an alternative embodiment, the embedding material 1000 may be formed of different materials in different regions of the tire. In another alternative embodiment, different regions of the tire may have multiple embedding materials of different materials.

The tire may be cured or otherwise heated, so that the embedding material 1000 softens. During such a process, the reinforcement layer 150 may become embedded into the embedding material 1000. Thus, the final tire may not have two distinct layers.

Figure 14:
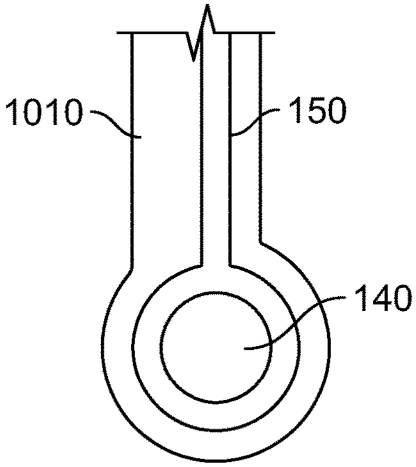
FIG. 14 is a schematic drawing illustrating a front view of an alternative embodiment of a spoke in a pre-cured tire.

FIG. 14 is a schematic drawing illustrating a front view of an alternative embodiment of a reinforcement layer 150 and an embedding material 1010 wrapped around an elongated member 140. In the illustrated embodiment, the reinforcement layer 150 and embedding material 1010 form a spoke similar to those shown in FIGS. 1-9. However, it should be understood that an embedding material may be employed on any spoke or webbing design, such as those shown in FIGS. 10 and 11, as well as the alternative designs discussed above.

In the illustrated embodiment, the embedding material 1010 is shown as having a variable thickness. Here, the left side of the spoke is shown as having a thicker embedding material than the right side of the spoke. It should be understood, however, that this illustration is merely exemplary. The thickness of the embedding material 1010 may be varied at any point along the tire.

In one embodiment, the embedding material 1010 is constructed of a single material. The embedding material 1010 may be constructed of a polymeric material, such as natural or synthetic rubber, or other elastomeric material. Alternatively, the embedding material 1010 may be constructed of a harder polymeric material such as polyurethane, polyester, nylon, or polyvinyl chloride (PVC). Alternatively, the embedding material may be one or more resins.

In an alternative embodiment, the embedding material 1010 may be formed of different materials in different regions of the tire. In another alternative embodiment, different regions of the tire may have multiple embedding materials of different materials.

The tire may be cured or otherwise heated, so that the embedding material 1010 softens. During such a process, the reinforcement layer 150 may become embedded into the embedding material 1010. Thus, the final tire may not have two distinct layers.

Figure 15:
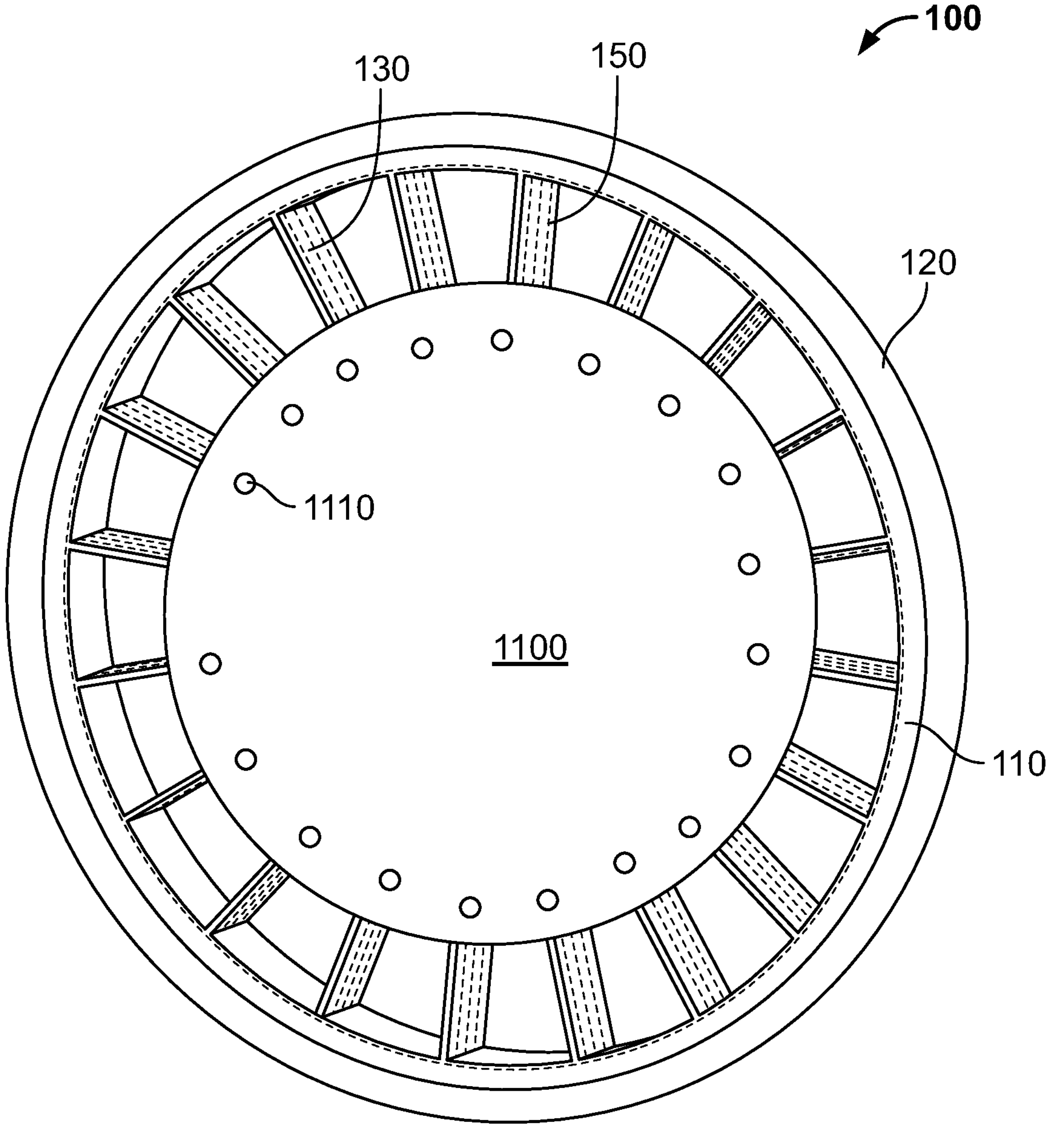
FIG. 15 is a perspective view of a non-pneumatic tire and rim assembly.
Figure 16:
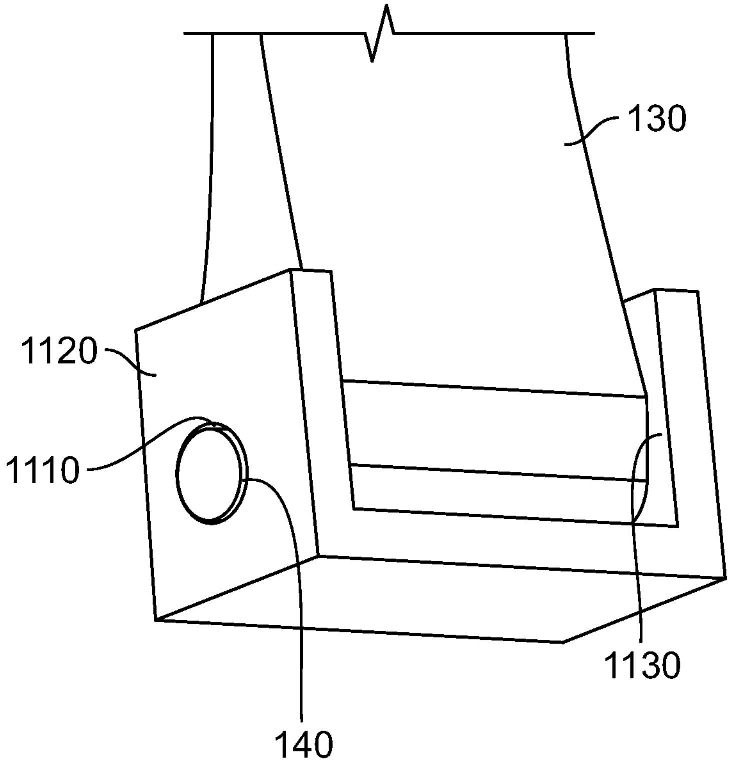
FIG. 16 is a detail view of one embodiment of an elongated member of a spoke received in a rim mount.
Figure 17:
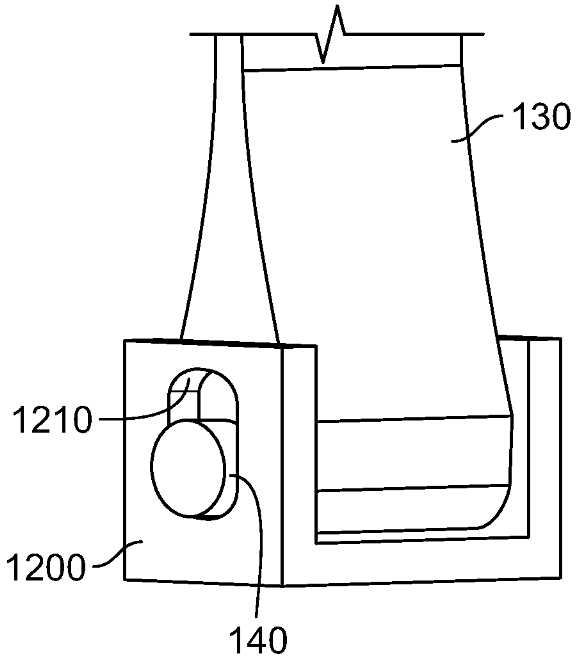
FIG. 17 is a detail view of an alternative embodiment of an elongated member of a spoke received in a rim mount.

FIGS. 15-17 show a non-pneumatic tire and rim assembly. In the illustrated embodiments, the non-pneumatic tire 100 of FIG. 1 is shown mounted in a rim 1100. However, it should be understood that these figures are not intended to be limiting and any of the alternative embodiments of the non-pneumatic tires described above may also be mounted on the rim 1100.

The mechanical interaction between the elongated members and attachment points at a rim may be selected to achieve different performances. In some embodiments, it may be desirable for the elongated members to be fixed with respect to the rim attachment points. In other embodiments, it may be desirable for the elongated member to rotate with respect to the rim attachment points, without translating. In still other embodiments, it may be desirable for the elongated member to translate with respect to the rim attachment points, without rotating. In such an embodiment, the inner diameter of the tire effectively changes during operation, as the elongated member moves with respect to the rim. In still other embodiments, it may be desirable for the elongated member to rotate and translate with respect to the rim attachment points.

In one embodiment, the slot and the elongated member each have an irregular geometry to limit rotation. For example, the elongated member may have a protrusion that forms a stopper.

FIG. 15 is a perspective view of one embodiment of a non-pneumatic tire and rim assembly. The non-pneumatic tire 100 is mounted on a rim 1100. In one embodiment, the rim 1100 includes a circumferential groove (not shown) configured to receive a portion of each of the plurality of elongated members 140. The rim 1100 further includes a plurality of apertures 1110, each of which is sized to receive one of the plurality of elongated members 140. In this embodiment, the circumferential groove and the plurality of apertures 1110 together define a plurality of mounts, with each mount being configured to receive the elongated member 140 of a corresponding spoke 130.

In an alternative embodiment, the rim 1100 includes a plurality of axially extending slots (not shown) instead of a circumferential groove. Each slot is configured to receive a portion of one of the plurality of elongated members 140. In this embodiment, the plurality of slots and the plurality of apertures 1110 together define a plurality of mounts, with each mount being configured to receive the elongated member 140 of a corresponding spoke 130.

FIG. 16 is a detail view of an elongated member 140 of a spoke 130 received in one embodiment of a rim mount 1120. A portion of the elongated member 140 is received in a slot or circumferential groove 1130. A first end and a second end of the elongated member 140 extends through a pair of apertures 1110. While only a single aperture 1110 can be seen in this view, it should be understood that an identical aperture is located on the opposite side of the rim mount 1120. In one embodiment, the elongated member 140 is a threaded rod, and each rod is mounted to the corresponding mount by a first nut fastened to the first end and a second nut fastened to the second end. In alternative embodiments, pins, clips, or other fasteners may be employed instead of nuts. In another alternative embodiment, a first end of the elongated member includes a flange and only a second end of the elongated member receives a fastener, such as a nut, pin, or clip.

In each of the described embodiments, the aperture 1110 is a circular aperture having a diameter slightly larger than the diameter of the elongated member 140. The fasteners are attached in a manner that allows the elongated member 140 to rotate within the circular aperture 1110. The fasteners prevent axial translation of the elongated member and the circular aperture 1110 prevents radial or circumferential translation of the elongated member 140.

FIG. 17 is a detail view of an elongated member 140 of a spoke received in an alternative embodiment of a rim mount 1200. A portion of the elongated member 140 is received in a pair of slots or circumferential grooves 1210. While only a single aperture 1210 can be seen in this view, it should be understood that an identical aperture is located on the opposite side of the rim mount 1200. In one embodiment, the elongated member 140 is a threaded rod, and each rod is mounted to the corresponding mount by a first nut fastened to the first end and a second nut fastened to the second end. In alternative embodiments, pins, clips, or other fasteners may be employed instead of nuts. In another alternative embodiment, a first end of the elongated member includes a flange and only a second end of the elongated member receives a fastener, such as a nut, pin, or clip.

In each of the described embodiments, the aperture 1210 is a slot extending in a radial direction and sized slightly larger than the diameter of the elongated member 140. The fasteners are attached in a manner that allows the elongated member 140 to rotate within the slot 1210, while the fasteners prevent axial translation of the elongated member 140. The slot allows for radial translation, but prevents circumferential translation of the elongated member 140. In other words, the elongated member 140 is free to rotate and free to translate in a radial direction.

In one embodiment, the slot may define two or more distinct attachment points. A camming feature may be employed to move the elongated member between pre-defined attachment points, rather than float to any position within the slot. In one such embodiment, the tire and rim assembly is a static system while in use. The user would adjust the cams between the pre-defined attachment points while the tire was not in use, and lock the cams into place. The attachment points would thus be fixed during use. In another such embodiment, the tire and rim assembly is a dynamic system while in use. An electrical, mechanical, or computer system would adjust the cams between the pre-defined attachment points during use of the tire.

In another embodiment, the rim attachment point is a slot and the elongated member is mounted to a spring, a gasket, or other flexible member. Thus, the elongated member may float within the slot in a controlled manner. The stiffness of the spring, gasket, or flexible member may be selected to optimize movement within the slot.

In another alternative embodiment, the elongated member is a hollow rod that is attached to a rim by a bearing rod. The bearing rod will allow the bottom of the spoke to rotate freely as the tire rotates.

In each of the above-described embodiments, the spokes 130 may be removeably mounted to the rim mounts. The use of fasteners such as nuts, clips, or pins allows the spokes to be easily removed from the rim. In an alternative embodiment, the spokes may be permanently attached to a rim.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire and rim assembly, the assembly comprising:

a non-pneumatic tire including:

a ring;

a circumferential tread disposed about the ring;

a plurality of spokes extending radially downward from the ring, wherein each spoke terminates at a lower end defined by an axially extending member, wherein each spoke includes a reinforcement at least partially wrapping around the axially extending member, wherein the reinforcement is a sheet of reinforcement material;

a rim including a plurality of mounts, each mount being configured to receive the axially extending member of a corresponding spoke, wherein the reinforcement includes a first reinforcement sheet with a first end terminating below the axially extending member and a second reinforcement sheet with a second end terminating below the axially extending member.

2. The assembly of claim 1, wherein each axially extending member is a rod and each mount includes a first aperture and a second aperture, and wherein each rod is received in a corresponding mount such that a first end of the rod extends through the first aperture and a second end of the rod extends through the second aperture.

3. The assembly of claim 2, wherein each rod is received in the corresponding mount such that the rod is free to rotate and free to translate in a radial direction.

4. The assembly of claim 2, wherein each rod is a threaded rod, and wherein each rod is mounted to the corresponding mount by a first nut fastened to the first end and a second nut fastened to the second end.

5. The assembly of claim 1, wherein each axially extending member is a bar having a rectangular cuboid shape.

6. The assembly of claim 1, wherein the reinforcement is embedded in a polymeric material.

7. The assembly of claim 6, wherein the polymeric material is coated with a protective material.

8. A method of making a non-pneumatic tire, the method comprising:

providing a ring;

providing a plurality of elongated members;

arranging the elongated members inside the ring, such that each elongated member extends in an axial direction relative to the ring;

providing a first ribbon of reinforcement material and a second ribbon of reinforcement material; and wrapping the first ribbon of reinforcement material and the second ribbon of reinforcement material around each of the elongated members, such that each of the first ribbon of reinforcement material and the second ribbon of reinforcement material terminates below the elongated member.

9. The method of claim 8, wherein each of the first ribbon of reinforcement material and the second ribbon of reinforcement material includes reinforcement material embedded in a green elastomeric material.

10. The method of claim 9, further comprising curing the non-pneumatic tire.

11. A non-pneumatic tire comprising:

a ring;

a circumferential tread disposed about the ring;

a plurality of support structures extending downwards from the ring, wherein an end of each support structure includes an axially extending member, and wherein each support structure includes a sheet of reinforcement material extending along a length of the support structure and terminating below the axially extending member.

12. The non-pneumatic tire of claim 11, wherein each support structure includes a bead filler disposed above the axially extending member.

13. The non-pneumatic tire of claim 11, wherein the plurality of support structures is a plurality of spokes.

14. The non-pneumatic tire of claim 11, wherein the plurality of support structures form a web.

* * * * *